(12) United States Patent
Kerns et al.

(10) Patent No.: US 9,279,416 B2
(45) Date of Patent: *Mar. 8, 2016

(54) SOLAR POWER SYSTEM

(71) Applicant: Sol-Electrica, LLC, Worthington, IN (US)

(72) Inventors: Gary R. Kerns, Worthington, IN (US); Bret M Lee, Sarasota, FL (US)

(73) Assignee: SOL-ELECTRICA, LLC, Worthington, IN (US)

( * ) Notice: Subject to any disclaimer, the term of this patent is extended or adjusted under 35 U.S.C. 154(b) by 197 days.

This patent is subject to a terminal disclaimer.

(21) Appl. No.: 13/871,365

(22) Filed: Apr. 26, 2013

(65) Prior Publication Data

US 2014/0318127 A1    Oct. 30, 2014

(51) Int. Cl.
  *F03G 6/00* (2006.01)
  *F03G 6/06* (2006.01)
  *F01D 1/36* (2006.01)

(52) U.S. Cl.
  CPC  *F03G 6/065* (2013.01); *F01D 1/36* (2013.01); *Y02E 10/46* (2013.01)

(58) Field of Classification Search
  CPC ............ F03G 6/065; Y02E 10/46; F01D 1/36
  USPC ...................... 60/641.8–641.15; 126/663, 643
  See application file for complete search history.

(56) References Cited

U.S. PATENT DOCUMENTS

| | | | |
|---|---|---|---|
| 1,061,206 A | 5/1913 | Tesla | |
| 2,864,879 A | 12/1958 | Toulmin | |
| RE25,242 E | 9/1962 | Toulmin | |
| 3,985,118 A | 10/1976 | Bard | |
| 3,993,041 A | 11/1976 | Diggs | |
| 4,000,733 A | 1/1977 | Pauly | |
| 4,010,732 A * | 3/1977 | Sawata et al. ................. | 126/688 |
| 4,068,474 A | 1/1978 | Dimitroff | |
| 4,144,875 A * | 3/1979 | Bruno et al. ................... | 126/662 |
| 4,249,083 A * | 2/1981 | Bitterly ........................ | 290/1 R |
| 4,265,223 A * | 5/1981 | Miserlis et al. ............... | 126/592 |
| 4,280,328 A * | 7/1981 | Falconer .................... | 60/641.12 |
| 4,308,857 A * | 1/1982 | Sims ............................. | 126/652 |
| 4,977,744 A * | 12/1990 | Lenz .......................... | 60/641.15 |
| 5,404,723 A * | 4/1995 | Parker et al. ............... | 60/641.15 |
| 6,000,211 A | 12/1999 | Bellac et al. | |
| 8,341,961 B2 | 1/2013 | Glynn | |
| 2009/0320830 A1* | 12/2009 | Bennett ........................ | 126/619 |
| 2011/0017269 A1* | 1/2011 | Fangman et al. ............. | 136/246 |
| 2011/0290235 A1 | 12/2011 | NewDelman | |
| 2012/0124999 A1 | 5/2012 | Gruss et al. | |

\* cited by examiner

*Primary Examiner* — Kenneth Bomberg
*Assistant Examiner* — Wesley Harris
(74) *Attorney, Agent, or Firm* — Michael A. Myers; Myers & Associates

(57) ABSTRACT

A solar power system includes a preheating device for heating first heat transfer fluid and second heat transfer fluid in separate tubes. The preheated second heat transfer fluid is routed to a boiler. The preheated first heat transfer fluid is routed through a plurality of heat sinks each associated with a solar radiation collector and concentrator. Vacuum chambers receive the solar radiation from dishes and direct energy to the heat sinks transferring the heat energy to first heat transfer fluid routed through the heat sink. The lower half of each chamber extends below each dish and has an interior reflective coating on the interior of the chamber side wall. The heated first heat transfer fluid is routed through a coil within the boiler to heat the second heat transfer fluid within the boiler. The boiler outlet steam is routed through a turbine, in turn, connected to a gearing system and an alternator.

16 Claims, 6 Drawing Sheets

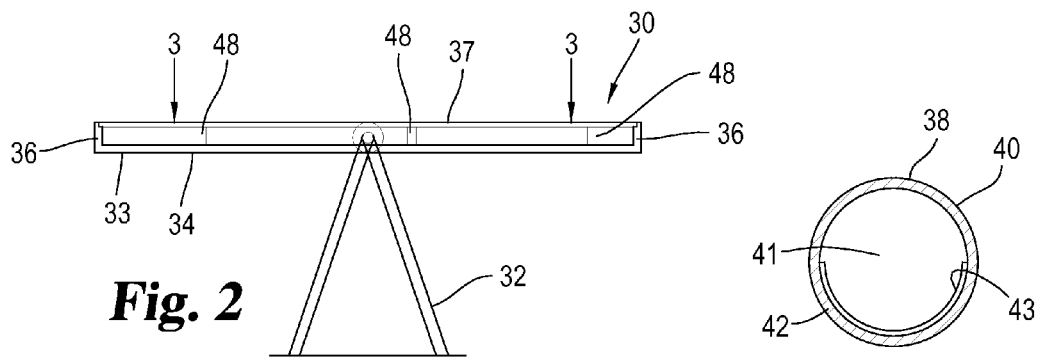
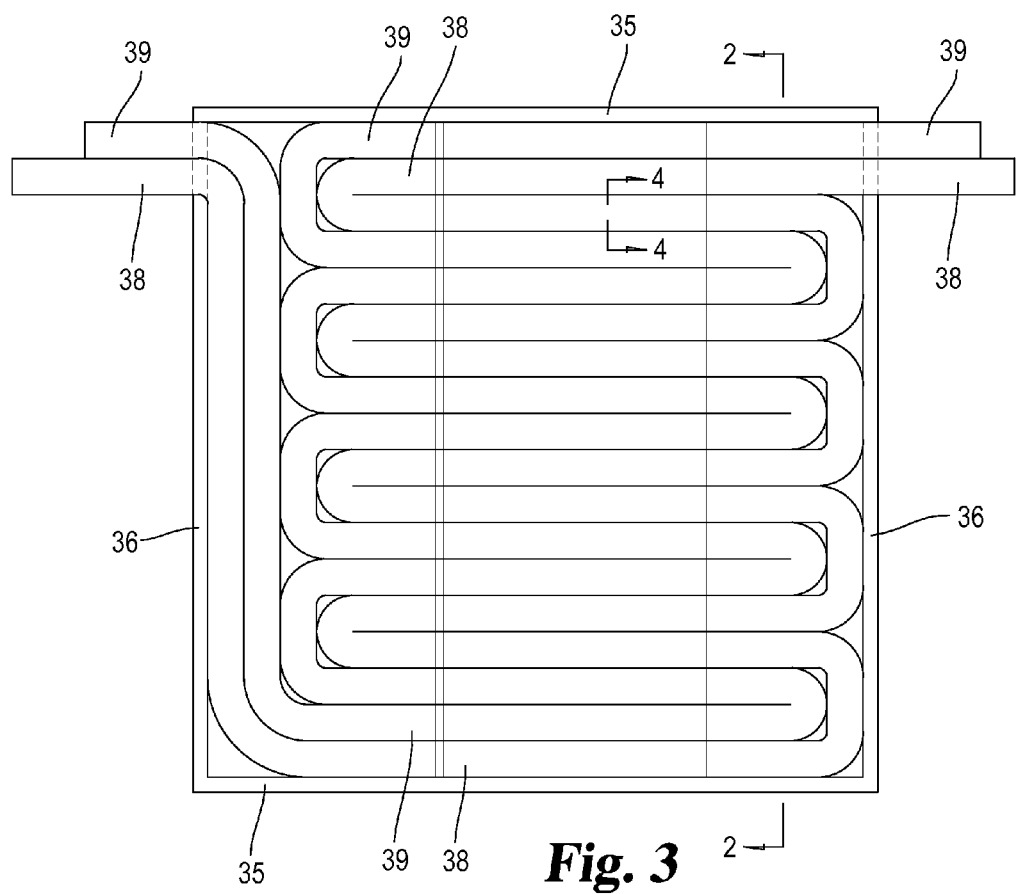

SOLAR POWER SYSTEM

BACKGROUND OF THE INVENTION

1. Field of the Invention

The present invention relates generally to the field of systems for converting solar energy into mechanical or electrical energy.

2. Description of the Prior Art

Increased emphasis has been placed on systems for converting solar energy into mechanical and/or electrical energy due to increased energy demand and the scarcity of certain natural resources. A variety of systems have been employed with many including solar collectors connected via a fluid system to a boiler, in turn, connected to various components for producing mechanical and/or electrical energy.

It is known to collect solar energy by a parabolic reflector and then direct the energy through a lens systems with the resultant heat energy directed onto a head of a conductor having a bottom end extending into a reservoir of water. Steam is thereby created in the reservoir and used to power a turbine. The resulting mechanical energy from the turbine may be used to generate electrical energy. Such an approach is discussed in U.S. Pat. No. 4,068,474 issued to Dimitroff.

In Patent Application Publication US 2012/0124999 of Gruss et al., there is disclosed a low temperature power plant including a tubular solar collector comprising an outer tube containing a vacuum and an inner tube. A plurality of the solar collectors are used to direct heat energy to a heat transfer fluid for powering a boiler and a turbine coupled to an electric generator.

U.S. Pat. No. 4,000,733 issued to Pauly discloses a solar furnace receiving reflected solar energy from a battery of positionable mirrors with the furnace having reflectors directing concentrated radiant energy towards a Fresnel lens.

U.S. Pat. No. 6,000,211 issued Bellac et al. discloses a combustion turbine power plant wherein air is cooled using solar energy and supplied to the air inlet of the power plant to support combustion. Further, the patent discloses combustion turbine power plants in which steam is produced using the solar energy and ejected into a turbine of the power plant.

U.S. Pat. No. 3,985,118 issued to Bard discloses a solar furnace wherein a plurality of Fresnel lenses focus light rays upon heat conductors. Fluid passing through an associated vessel, it is used to provide steam for a steam turbine associated with an electrical generator.

U.S. Patent Application Publication 2011/0290235 of NewDelman discloses an evacuated solar conductor having a cavity positioned between a top casing that is partially transparent and a bottom portion forming a heat sink. Solar energy is transmitted through the transparent top casing to the heat sink portion.

In the U.S. Pat. No. 3,993,041 issued to Diggs, there is disclosed a solar energized steam generator system wherein a lens is used for collecting and concentrating solar energy along with reflector funnel for enhancing and concentrating the solar energy. The funnel is connected by means of a conduit to an insulated vault. An air duct operatively connected to the vault is in a heat exchange relationship with a steam generator.

U.S. Pat. No. 8,341,961 discloses a solar desalination system wherein a hydroturbine is connected to a steam turbine condenser for the purpose of generating desalinated water.

U.S. Pat. No. 1,061,206 discloses an example of a bladeless turbine and is herewith incorporated by reference on the structure of one such turbine.

SUMMARY OF THE INVENTION

One embodiment of the present invention is a solar power system for converting solar radiation into mechanical and electrical energy. The solar power system includes a preheater with a first tube to hold a first heat transfer fluid and a second tube to hold a second heat transfer fluid. The first tube and the second tube have side walls allowing solar radiation to flow inwardly through the side walls and preheat the first heat transfer fluid and second heat transfer fluid but limit flow of radiation outwardly there from. A combination collector and concentrator has a vacuum chamber containing an internal heat sink with a circuitous passage. The collector and concentrator collects solar radiation and concentrates energy via the vacuum chamber into the heat sink. A first heat transfer fluid conduit extends to and between the first tube and the heat sink routing the first heat transfer fluid through the circuitous passage of the heat sink to allow heat in the heat sink to be absorbed by the first heat transfer fluid in the first conduit. The heated first heat transfer fluid is then directed to a boiler heating the second heat transfer fluid within boiler. A turbine is connected to a steam output of the boiler and is operable to convert energy into a mechanical output. An alternator is operable to convert the mechanical output of the turbine into electrical energy.

It is an object of the present invention to collect, concentrate and convert solar radiation into heat which is then transferred to a fluid for use in powering a heat engine.

It is an object of the present invention to provide a new and improved solar power system for converting solar radiation into mechanical and/or electrical energy.

Related objects and advantages of the present invention will be apparent from the following description.

BRIEF DESCRIPTION OF THE DRAWINGS

FIG. 2 is a side view of the solar panel shown in FIG. 1 pivotally mounted atop a base.

FIG. 3 is an enlarged top view of the solar panel shown in FIG. 1 and FIG. 2.

FIG. 4 is an enlarged cross-sectional view taken along a line and viewed in the direction of arrows 4-4 of FIG. 3 illustrating the construction of a fluid conveying tube.

DESCRIPTION OF THE PREFERRED EMBODIMENT

Figure 1:
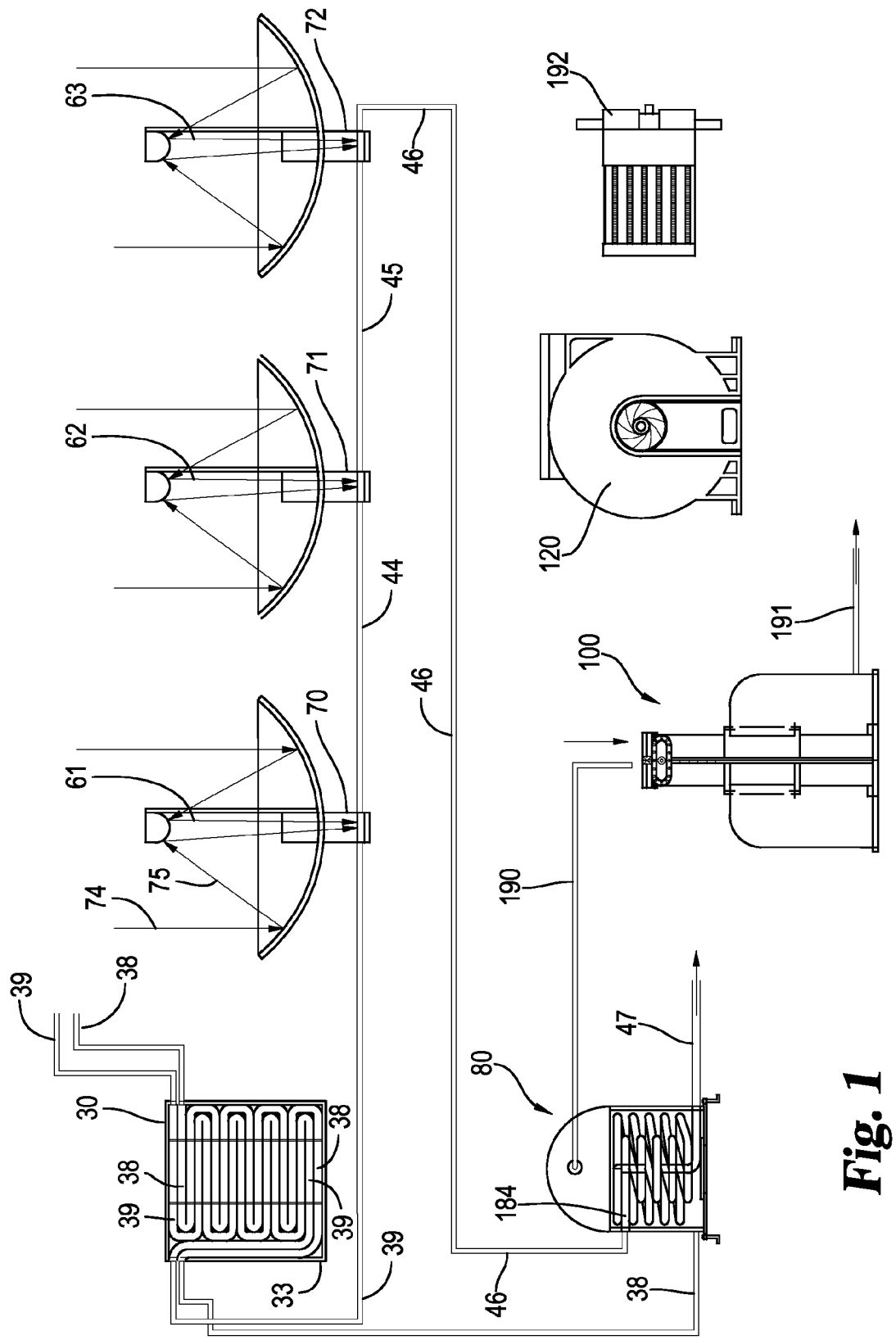
FIG. 1 is a schematic flow diagram illustrating the major components of the solar power system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The solar power system begins with the preheating of two heat transfer fluids. At the beginning of a day's cycle the sun's radiation penetrates the transmissive front of a dual heat transfer fluid preheating modular tracking panel 30 (FIG. 1) and travels through the partial vacuum which is enclosed in housing 33 that also contains transmissive glass tubes 38 and 39 (FIG. 3). The tubes have copper inner lining 43 (FIG. 4) that act as a heat sink to further capture and radiate the fullest amount of solar energy and prevent the loss of radiation through the back portion 42 (FIG. 4) of the internal high pressure tubing 38 and 39. Panel 30 is a dual preheating device that allows the fullest amount of solar radiation to excite and heat fluids circulated through tubes 38 and 39 by remaining nearly perpendicular to the sun's rays during morning hours of each daily cycle. Since both fluids are in a closed loop, the pressure within the tubes builds during the preheating process and thus the need for very high pressure resistant transmissive tubing. For example, 100 atmospheres or more may be obtained during peak performance of the complete system at maximum thermal capacity.

The flow of each fluid remains stagnant until the proper temperature and saturated steam psig is reached in the micro-boiler 80 (FIG. 1) for the system to begin normal operations. Once at operation temperature, circulation valves are open and pumps begin circulating the fluids through the complete system. Pumps are used to circulate the second heat transfer fluid in tube 38 and the first heat transfer fluid in tube 39 through the system and back to panel 30. The heat transfer fluid circulated through tube 39 is in the preferred embodiment is a gas, whereas the fluid circulated through tube 38 is a liquid, such as water. It is to be understood that the present invention includes fluids circulated through tubes 38 and 39, such as a gas in tube 39 and a liquid in tube 38 so long as the fluid circulated through tube 38 when boiled turns to steam or gas to drive the turbine connected to the boiler. The liquid circulated through tube 38 may therefore be referred to as a boiler turbine fluid and is dissimilar from the heat transfer fluid circulated through tube 39. The fluid circulated through tube 38 is pumped from panel 30 directly into micro-boiler 80. The first heat transfer fluid, for example pressurized helium, is pumped through tube 39 from panel 30 and then through heat sinks attached to a plurality of collector concentrators 61-63 (FIG. 1) gaining heat through each pass through heat sinks. The first heat transfer fluid is then pumped into coils within the boiler 80 to heat the second heat transfer fluid to a predetermined operational psig. In the embodiment shown in FIG. 1, there are three collector concentrators connected together in series thereby comprising collector concentrator 61, 62 and 63. Less than three or more than three collector concentrators are included in the present invention depending upon the amount of heat desired to heat the first heat transfer fluid circulated through the system to the micro-boiler.

Each collector concentrator during normal operation track the sun's daily path, according to known techniques, and collect and concentrate the full spectrum radiation into a vacuum chamber and heat sink in order to transfer the heat into the first heat transfer fluid that is travelling through the thermally insulated device.

Once both the second and first heat transfer fluids circulated through the system reach the desired temperature and the desired pressure inside the micro-boiler is obtained, a saturated steam valve is open and the steam or fluid exits the micro-boiler and routed to the blades or discs of turbine 100. The rotatable output of turbine 100 is connected to a gear system, such as an epicyclic gear mechanism 120 (FIG. 1), in turn, connected to alternator 192 to begin producing electric current. The turbine remains operational from a predetermined RPM range output through the entire daily sunlight cycle.

Referring now more particularly to FIGS. 2-4, tracking panel 30 includes a rectangular shape solar housing 33 pivotally mounted atop base 32. Housing 33 includes a rigid box shape construction with a bottom wall 34 joined to a pair of end walls 35 and a pair of side walls 36. The top wall 37 is mounted to the end walls and side walls thereby forming an enclosure in which tubes 38 and 39 extend back and forth between the side walls 36 in a side by side relationship along the length of housing 33 between the opposite end walls 35. In the preferred embodiment, top wall 37 is produced from a glass to allow the sun rays to penetrate whereas walls 34 and 36 are produced from metal. The resultant enclosure formed by walls 34-37 is a vacuum or at least partial vacuum enclosure through which tubes 38 and 39 extend. In order to provide structural rigidity for glass wall 37 a plurality of strengthening spacers 48 are provided extending from bottom wall 34 toward and against top wall 37. Spacers 48 (FIG. 2) are rigid and may take many different shapes and forms. For example, in the preferred embodiment spacers 48 are pins. In order to provide adequate space for spacers 48 to extend between walls 34 and 37, tubes 38 and 39 may be slightly spaced apart to accommodate the pins.

The main purpose of the solar panel 30 is to preheat the fluids within each tube 39 and 38 prior to entering respectively the heat sinks of the collector/concentrators 61-63 (FIG. 1) and the micro-boiler 80. Both the first heat transfer fluid circulated in tube 39 and the liquid, such as water, circulated through tube 38 are in a closed loop system and enter one end of panel 30 adjacent one of the side walls and then exit through the same tube on the opposite side of panel 30. Tubes 38 and 39 are placed beneath and adjacent top wall 37 which is produced from a highly sunlight transmissive material, such as glass. The remaining walls of housing 33 are opaque to the passage of solar radiation. Top wall 37 remains perpendicular to the sun's radiation by a two axis tracking device. Axis solar tracking devices are commercially available. For example, a slew drive solar tracker is available from SAT Control, Pozenik 10, 4207 CERKLJE, SLOVENIA.

Tube 38 (FIG. 4) will now be described it being understood that an identical description applies to tube 39. Tube 38 has a top portion 40 and a bottom 42 formed in one integral piece forming an interior passage 41 for the second heat transfer fluid to flow there through. Top portion 40 has side walls allowing the solar radiation to pass therethrough and preheat the second heat transfer fluid in the tube. A copper sleeve heat sink 43 is positioned inside passage 41 adjacent the interior surface of bottom portion 42 preventing the sun radiation from passing directly through the internal high pressure tube and hitting the bottom wall 34 of housing 33 to be lost or scattered or unabsorbed radiation. The copper sleeve also acts as an internal heat sink and continues to heat the second heat transfer fluid circulated through tube 38 during normal daylight operations.

Tube 39 is identically constructed as described for tube 38 with the exception that tube 38 is designed to be functional at 150 psig which is the hot water pressure achieved during peak operational periods whereas the borosilicate glass tube 39 is designed to be functional at 1500 psig if the fluid circulated through tube 39 is helium with 1000 lambda thermal conductivity at 100 atmospheres.

Each tube 38 and 39 enter one of the side walls 36 of housing 33 and then extends across the width of the housing between the side walls in a back and forth or serpentine fashion from one end wall 35 to the opposite end wall 35 until eventually both tubes 38 and 39 exit the opposite side wall 36.

Housing 36 is sealed and is partially evacuated containing less air than the air surrounding the panel. Tubes 38 and 39 are sealed thereby separating the first and second heat transfer fluids from the internal air, if any, within housing 33. Each high pressure transmissive tube 38 and 39 inside housing 33 is composed of straight portions and requires a connector to achieve 90 and 180 angle turns within the enclosure before exiting the other side. Both the side entrance of each tube into the housing and the side exit of each tube are aligned so that modularity can be achieved if additional panels are needed for scaled systems. Internal separators 48 within the housing hold the high pressure tubes away from all internal surfaces of the interior of the panel that also help to reduce the tendency of the transmissive glass sheet 37 from warping towards the interior due to the partial vacuum.

Collector concentrator 61 will now be described it being understood that an identical description applies to collector concentrator 62 and 63. A solar thermal vacuum chamber and heat sink are mounted to and beneath a dish 67. Thus, heat sink 70, 71 and 72 are mounted to respectively the dishes of collector concentrators 61, 62 and 63. Heat sink 70 will now be described it being understood that an identical description applies to heat sinks 71 and 72 (FIG. 1).

Figure 5:
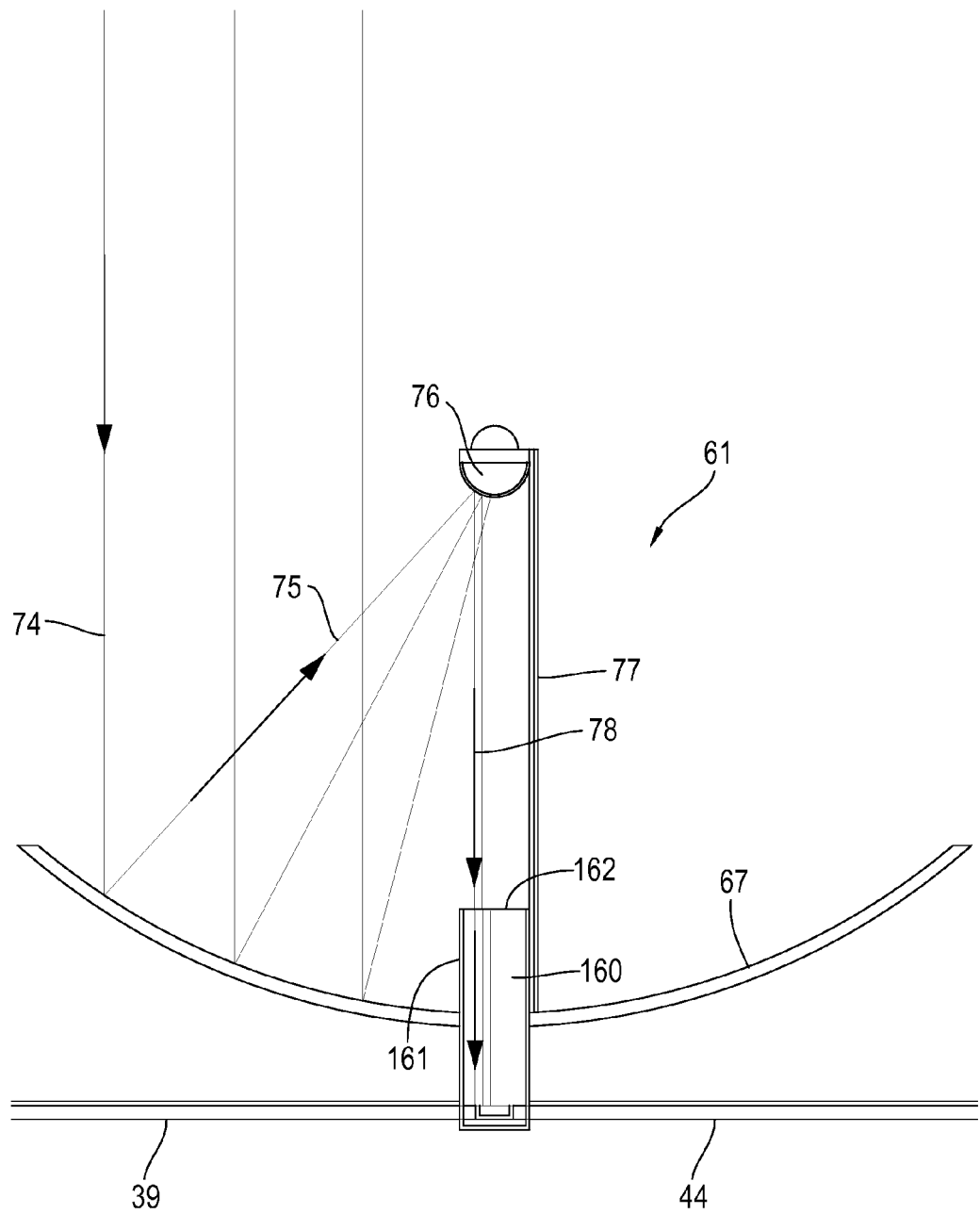
FIG. 5 is an enlarged view of the collector/concentrator illustrated in FIG. 1.
Figure 6:
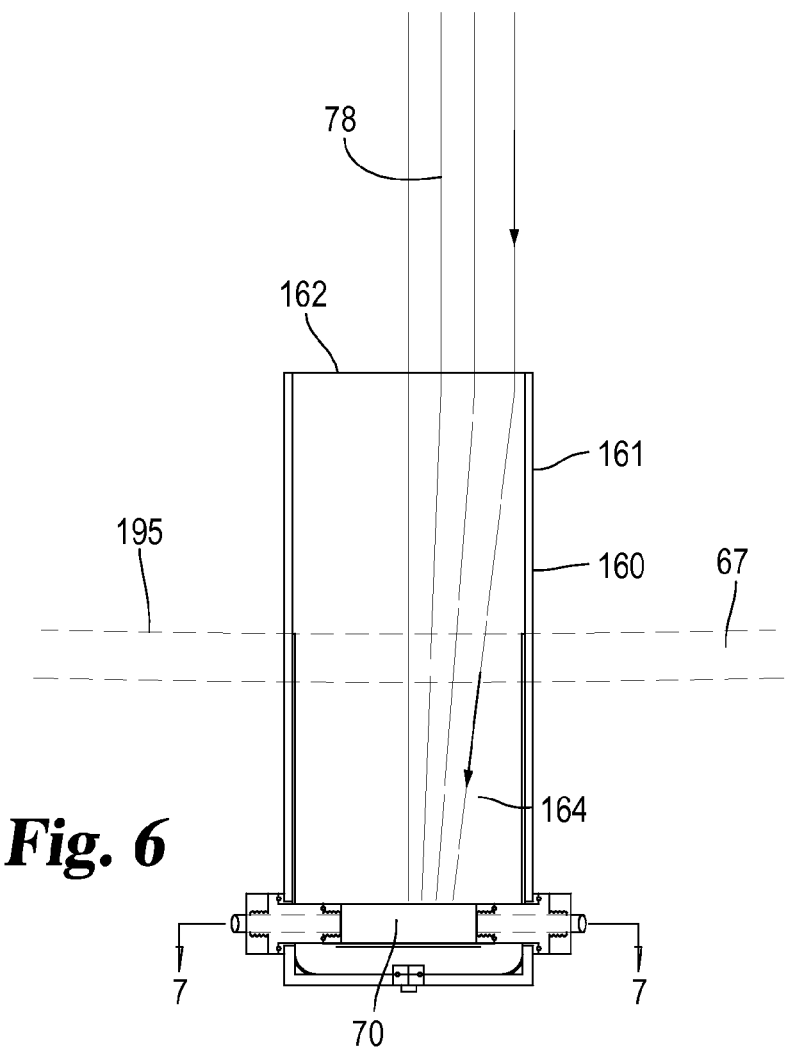
FIG. 6 is an enlarged cross sectional view of the vacuum chamber with a heat sink shown mounted to the dish of FIG. 5.

The main purpose of the solar collector and concentrators 61-63 including the associated solar thermal vacuum chambers and heat sinks is to convert the sun's radiation into usable heat energy. The design of the collector and concentrator 61 is such that nearly 90%+ of the sun's radiation is focused into the vacuum chamber 160 (FIG. 5). The design of the solar thermal vacuum is such that nearly all of the captured solar radiation is converted into heat energy without radiant or reflective loss. All of the converted solar radiation is contained in the internal heat sink 70 (FIG. 6). In the beginning of each sunlight day, the vacuum chamber 160 turns toward the rising sun so that the main axis of the parabolic dish 67 is positioned to receive the sun's rays. The vacuum chamber 160 is positioned parallel to the sun's rays 74 by the use of a conventional solar tracking system which connects to the underside of the main parabolic dish through three tracks and slew drive positioners. The sun's rays hit the parabolic dish 67 and reflect off the highly reflective surface of the top side or sun side of the dish. The reflected light rays 75 are then directed towards a raised hyper parabolic concentrator 76 (Cassagrain design) or a conflex or a convex reflective concentrator (Gregorian design). The concentrated rays 78 are focused into the transmissive top 162 of chamber 160.

The sun's rays 74 are collected by dish 67 (FIG. 5) resulting in reflective rays 75 directed upwardly to an ellipsoid concentrator 76 which, in turn, directs the rays 78 downwardly to vacuum chamber 160. Strut 77 is connected to concentrator 76 and dish 67 and supports the concentrator. It has been determined that the support strut prevents harmonic vibrations from occurring in any given wind environment if irregular holes are drilled through the entire strut along the length thereof.

Figure 9:
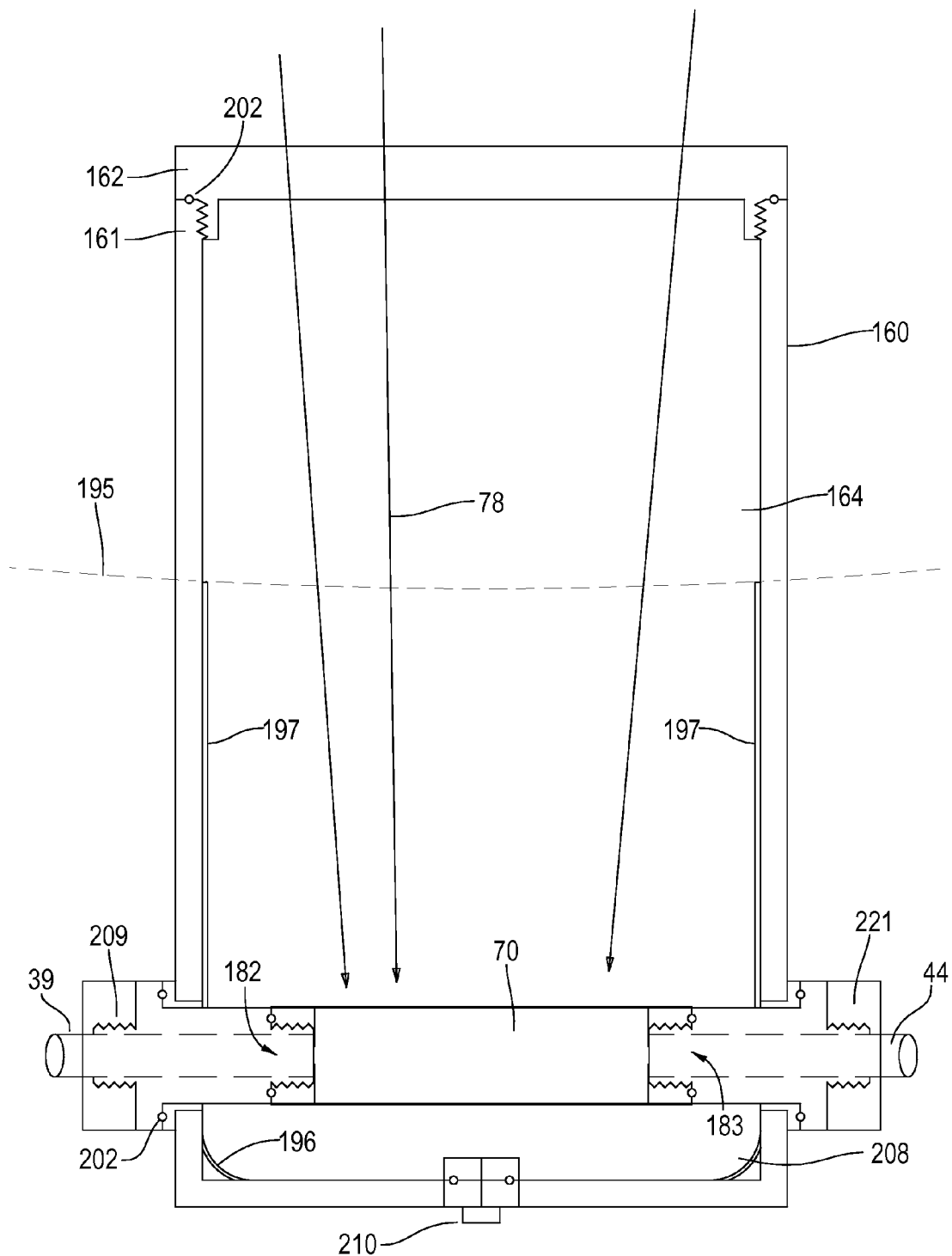
FIG. 9 is an enlarged cross-sectional view of the vacuum chamber with heat sink of FIG. 5.

Referring to FIGS. 5, 6, and 9, the vacuum chamber 160 includes upwardly extending rigid side walls 161. By the term side walls 161 is meant either a single wall forming the interior chamber or a plurality of walls 161 forming the interior chamber. Side walls 161 and heat sink 70 form an enclosure 164 in which a vacuum is provided to prevent any heat loss. Side walls 161 are produced from a reflective material, such as high quality borosilicate glass so that rays 78 converge towards the heat sink. Side walls 161 surround heat sink 70 and are spaced apart there from allowing the vacuum within chamber 164 to prevent heat loss.

Side walls 161 extend through dish 67 and are attached to the center of the main parabolic dish. Those portions of side walls 161 located above the dish are completely transmissive allowing not only direct focus sun rays to enter through the side walls but incident light to enter from the sides. The side walls 161 have inwardly facing reflective surfaces to reflect the incident light onto the surface of the heat sink. This assures that all available sunlight is directed and converted into heat energy.

Figure 7:
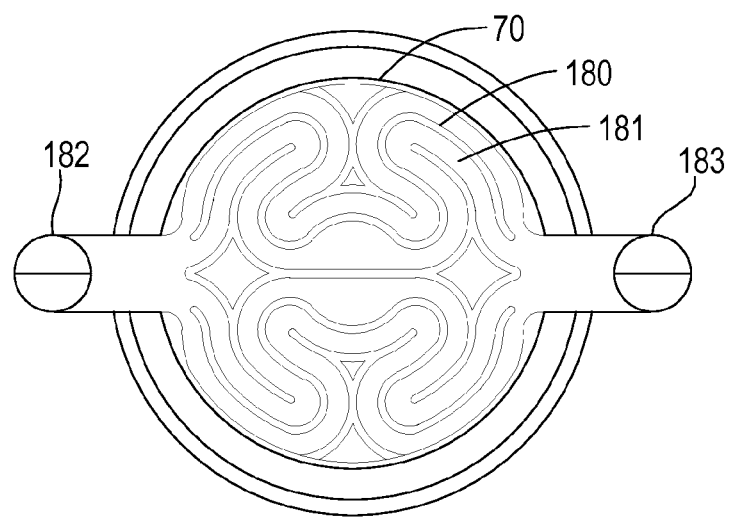
FIG. 7 is an enlarged cross-sectional view taken along a line and viewed in the direction of arrows 7-7 of FIG. 6 illustrating the heat sink.

Vacuum chamber 160 has a circular screw-on cap 162 produced from high quality borosilicate glass which is threaded onto side walls 161 with an Indium o-ring 202 positioned therebetween to insure the integrity of the vacuum. Side walls 161 form the chamber with a heat sink 70 located in the bottom portion of the chamber being entirely positioned therein. The internal heat sink 70 (FIG. 6) is a round disc which is smaller in diameter than the inner diameter of the vacuum chamber. The heat sink is hollow with multiple interior heat sink fins 180 (FIG. 7) with the fins spaced apart from each other forming an interior maze 181 through which the first heat transfer fluid from the first heat transfer fluid tube 39 (FIG. 1) enters via heat sink inlet 182 (FIG. 7) thereby allowing the heat from the solar radiation directed into the fins to be transferred to the first heat transfer fluid passing through the maze. A coupling 209 is provided on the bottom portion of chamber 160 which is connected to tube 39 directing the incoming fluid to heat sink 70. A second coupling 221 is provided in the bottom portion of chamber 160 which is connected to tube 44 receiving the fluid from the heat sink 70.

Chamber 160 is mounted to the dish 67 with one half of the chamber extending above the upper surface 195 (FIG. 6) of the dish and the remaining one half of the chamber extending below the dish. A reflective coating 197 (FIG. 9) on the interior surface of side wall 161 extends from the dish down through the lower half of the chamber and into a partial vacuum interior 208 at the bottom of the chamber. The coating 197 forms a corner coating 196 at each of the corners formed between the side walls and the bottom wall of interior 208 beneath the heat sink. Coating 197 prevents stray light from exiting the bottom of the chamber and will reflect the light back into the bottom and top of the heat sink. Such a coating is available from the 3M Company under the designation Solar Mirror Film 1100

Chamber 160 extends below heat sink 70 forming a partial vacuum interior 208 in communication with a vacuum evacuator hose nozzle 210. In the embodiment of FIG. 1, three identical collector concentrators 61-63 with vacuum chambers and heat sinks are arranged in series so that the first heat transfer fluid heated by each heat sink successively adds heat to the first heat transfer fluid flowing through each sink. The heated first heat transfer fluid is then routed into boiler 80 to heat the second heat transfer fluid in the boiler.

Figure 8:
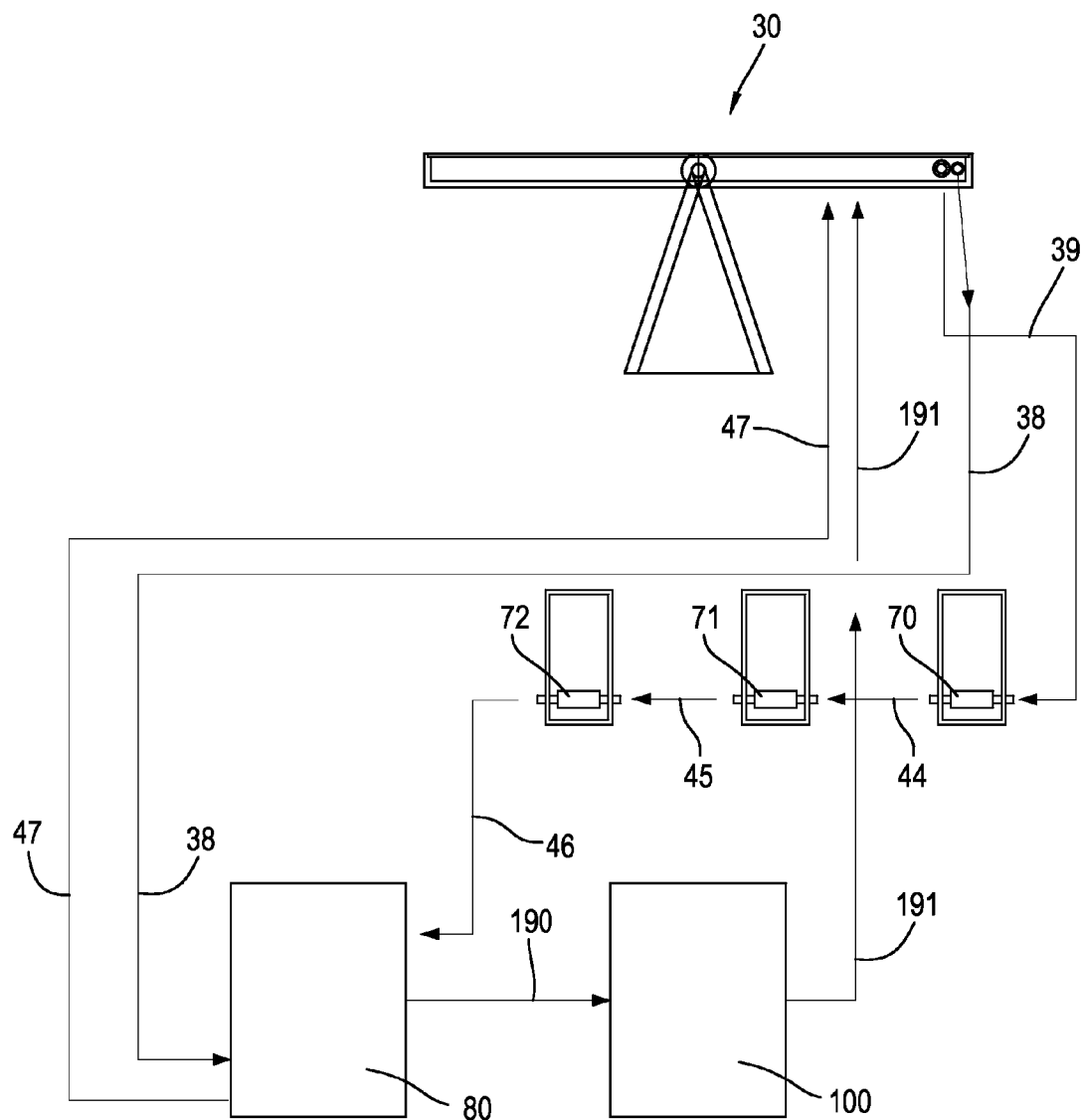
FIG. 8 is a flow diagram illustrating the flow of first heat transfer fluid and second heat transfer fluid between the major components of the solar power system of FIG. 1.

Referring to FIG. 8 there is shown a flow diagram of the solar power system. Pre-heated second heat transfer fluid flows outwardly from panel 30 via tube 38 directly to boiler 80 where it empties into the boiler. Pre-heated first heat transfer fluid flows outwardly from panel 30 via tube 39 to the inlet 182 (FIG. 7) of heat sink 70 of the first collector concentrator 61 where the first heat transfer fluid flows through the maze 181 of the heat sink while receiving heat from the heat sink and exiting via outlet 183. Conduit 44 is connected to outlet 183 routing the heated first heat transfer fluid to the inlet of the heat sink 71 of the second collector concentrator 62 where the first heat transfer fluid flows through the maze of the second heat sink 71 wherein additional heat is added to the first heat transfer fluid. The first heat transfer fluid exits the outlet of heat sink 71 which is connected to conduit 45. Conduit 45 is connected to the outlet of heat sink 71 and the inlet of heat sink 72 of the third collector concentrator 63. The first heat transfer fluid is routed through the maze of heat sink 72 where additional heat is added to the first heat transfer fluid. Conduit 46 is connected to the outlet of heat sink 72 and the inlet of a coil 184 (FIG. 1) of boiler 80 wherein the heat in the first heat transfer fluid flows from the coil to the second heat transfer fluid contained in the boiler.

In the preferred embodiment, water is used as the second heat transfer fluid preheated in panel 30 and directed via tube 38 to boiler 80 although it is understood that other fluids may be utilized. Steam is created within the boiler and routed from the boiler 80 via conduit 190 to the inlet of a bladeless turbine 100 wherein the steam drives the discs of the turbine. The fluid from conduit 190 acts on the turbine discs imparting rotary motion to an axle upon which the discs are mounted. An Epicyclic Gearbox or Planetary Gearbox 120 may be used to step down the high turbine RPM for driving an alternator 192 to produce alternating current. Such gearboxes and alternators are well known in the industry. Bladeless turbines are known. For example, U.S. Pat. No. 1,061,206 discloses an example of a bladeless turbine.

The steam, in the case of water being used as the second heat transfer fluid in boiler 80, passes through turbine 100 and is converted to water which is then routed back via conduit 191 to the water tube 38 connected to the inlet of the panel preheating device 30 to continue the process. The first heat transfer fluid routed through the coil 184 of boiler 80 is routed back via conduit 47 to the first heat transfer fluid inlet tube 39 connected to the inlet of the panel preheating device 30 to continue the process.

Many variations are contemplated and included in the present invention. For example, once the solar power system is operating at full power, the water circulated through the system can be switched from a closed loop system to provide hot water for commercial and residential usage. Hot water storage tanks (hot water heaters), interior floor tube heating, hot tubs, and swimming pools can be fed from the excess hot water. Another use of the present invention is to power a desalination system by connecting a hydroturbine to the condenser of a steam turbine for the purpose of producing desalinated water. U.S. Pat. No. 8,341,961 is herewith incorporated by reference for showing how one such steam turbine is used to produce desalinated water. The system disclosed herein is particularly useful when at a predetermined time, nearing the end of the sunlight day, the system will again be switched to a closed loop arrangement but in a stagnate state gaining heat and storing it for the next days needed start-up temperature.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A solar power system for converting solar radiation from the sun into electrical energy comprising:
   a pre-heater including a first tube to hold a first heat transfer fluid and a second tube to hold a second heat transfer fluid, said first tube and said second tube have side walls allowing solar radiation to flow inwardly through said side walls and preheat said first heat transfer fluid and second heat transfer fluid but limiting flow of radiation outwardly through said side walls;
   a collector concentrator having a dish with a vacuum chamber mounted to and beneath said dish, said chamber having an internal heat sink with a circuitous passage located in a bottom portion of the chamber, said collector concentrator collecting solar radiation and concentrating energy via said vacuum chamber into said heat sink;
   a first heat transfer fluid conduit extending to and between said first tube and said heat sink routing said first heat transfer fluid through said circuitous passage of said heat sink to allow heat in said heat sink to be absorbed by said first heat transfer fluid in said first conduit;
   a boiler having a steam output for steam to flow outwardly there from;
   a second heat transfer fluid conduit extending to and between said second tube and said boiler routing said second heat transfer fluid in said second tube into said boiler;
   a turbine operable to convert energy into a mechanical output;
   a steam conduit extending to and between said output of said boiler and an input of said steam turbine routing steam from said output of said boiler into said turbine; and
   an alternator operable to convert said mechanical output into electrical energy.

2. The solar power system of claim 1 in which said pre-heater is pivotably mounted and movable to orient said first tube and said second tube to remain perpendicular relative to the solar radiation.

3. The solar power system of claim 1 in which said side walls of said first tube and said second tube have an internally located metal blocking wall limiting outwardly flow of energy through said side walls.

4. The solar power system of claim 1 further comprising a plurality of collector concentrators each having a heat sink with a circuitous passage through which said first heat transfer fluid from said pre-heater is routed.

5. The solar power system of claim 1 in which said pre-heater includes an enclosure holding said first tube and said second tube, said enclosure having an internal atmosphere at lower pressure than ambient atmosphere surrounding said enclosure, said enclosure having a transmissive wall through which solar radiation may flow to said first tube and said second tube, said first and second tubes extend circuitously through said enclosure behind said transmissive wall, said pre-heater is pivotable to orient said transmissive wall to remain perpendicular to the solar radiation.

6. The solar power system of claim 1 in which said collector concentrator includes a primary reflector dish to receive solar radiation, a secondary reflector to receive solar radiation reflected off of said primary reflector dish, said vacuum chamber is mounted to the primary dish with one half of the chamber extending above an upper surface of said primary dish and the other half of the chamber extending below said primary dish, said vacuum chamber receives said solar radiation from said secondary reflector and directs same into said heat sink, said vacuum chamber directing accumulated solar radiation from said secondary reflector toward said heat sink.

7. The solar power system of claim 6 in which said collector concentrator includes a cassegrain antenna.

8. The solar power system of claim 6 in which said boiler has a first inlet connected to said second heat transfer fluid conduit to receive second heat transfer fluid from said second conduit and has a coil connected to said first heat transfer fluid conduit to receive first heat transfer fluid in said first heat transfer fluid conduit and heat therein to heat the second heat transfer fluid within said boiler to produce steam routed outwardly from said boiler via said steam output, said first heat transfer fluid is a gas and said second heat transfer fluid is a liquid;

said first tube and said second tube are in a side by side relationship in said pre-heater and are glass withstanding pressures of at least 100 atmospheres within each tube; and said turbine is a bladeless turbine.

9. A solar power system for converting solar radiation into electrical energy comprising:
- a pre-heater to convert solar radiation into heat includes a housing having a first tube holding a first heat transfer fluid and a second tube holding a second heat transfer fluid, said first tube and said second tube winding though said housing, said housing has a radiation transmissive wall for allowing solar radiation to penetrate into said housing to said first tube and said second tube allowing solar radiation to penetrate respective side walls of said first and second tubes to preheat said first heat transfer fluid and said second heat transfer fluid;
- a plurality of dishes with concave shapes to collect solar radiation, each of said dishes including a concentrator with a vacuum chamber and a heat sink, a portion of each vacuum chamber extends through an upper surface of its respective dish to receive solar radiation collected by said dish and concentrate the radiation into said heat sink;
- a boiler in which to heat said second heat transfer fluid, said boiler having a coil for said first heat transfer fluid to flow through and operable to heat said second heat transfer fluid within said boiler;
- a first conduit connecting said first tube to said heat sinks and operable to allow heat to transfer from said heat sinks into said first heat transfer fluid and then routing said first heat transfer fluid to said coil in said boiler to transfer heat in said first heat transfer fluid to second heat transfer fluid within said boiler; and,
- a second conduit connecting said pre-heater to said boiler and operable to direct fluid to flow into said boiler.

10. The solar power system of claim 9 in which said first tube and said second tube each has an interior passage defined by walls with a top portion and a bottom, a heat blocking barrier positioned inside the passage adjacent the bottom to limit outward flow of heat.

11. The solar power system of claim 10 further comprising said first conduit connected to said pre-heater and said boiler to route first heat transfer fluid, which is gas, in said coil back to said pre-heater; and said second conduit connected to said boiler and said pre-heater to route second heat transfer fluid, which is water, in said boiler back to said pre-heater.

12. The solar power system of claim 11 in which each of said vacuum chambers includes a solar radiation inlet and, said inlets are positioned to receive solar radiation from said dishes, each of said chambers includes a reflective surface to direct solar radiation within said chambers into said heat sinks.

13. A solar power system for converting solar radiation into electrical energy comprising:
- a first tube holding a first heat transfer fluid;
- a second tube holding a second heat transfer fluid, said first tube and said second tube both having side walls allowing solar radiation to penetrate therein to respectively said first heat transfer fluid and said second heat transfer fluid;
- a solar collector concentrator to convert solar radiation into heat energy, said collector concentrator having a dish, a vacuum chamber, a heat sink to receive the solar radiation collected by the dish and an ellipsoid concentrator supported above the dish for directing the solar radiation from said dish downwardly to the vacuum chamber and the heat sink;
- a boiler having a coil therein operable to heat said second heat transfer fluid and for said first heat transfer fluid to flow through the boiler and heat said second heat transfer fluid;
- a first conduit connecting said first tube to said heat sink and operable to allow heat to transfer from said heat sink into said first heat transfer fluid and then routing said first heat transfer fluid to said coil in said boiler to transfer heat in said first beat transfer fluid to the second heat transfer fluid within said boiler; and,
- a second conduit connecting said second tube to said boiler and operable to direct the second heat transfer fluid in said second conduit to flow into said boiler.

14. The solar power system of claim 13 in which said heat sink includes a plurality of fins creating a maze through which first heat transfer fluid from said first conduit is routed.

15. The solar power system of claim 14 further comprising a turbine connected to said boiler to receive steam from the boiler created by said first heat transfer fluid; and,
an alternator connected to said turbine.

16. The solar power system of claim 15 further comprising a housing having said first tube and said second tube winding there though, said housing having a radiation transmissive wall allowing solar radiation to penetrate into said housing to said first tube and said second tube.

* * * * *